United States Patent
Futch et al.

(10) Patent No.: US 10,870,131 B2
(45) Date of Patent: *Dec. 22, 2020

(54) MOBILE SORTER PLATFORMS AND METHOD FOR SORTING ARTICLES

(71) Applicant: Tompkins International, Raleigh, NC (US)

(72) Inventors: Michael C. Futch, Raleigh, NC (US); James M. Serstad, Orlando, FL (US); Ryan Fehrenbacher, Chicago, IL (US); Milan Patel, Cleveland, OH (US); Ray Wells, Asheville, NC (US); Steven Wu, Raleigh, NC (US); Richard C. Kaminska, III, Orlando, FL (US); James Edouard, Orlando, FL (US); Denny McKnight, Raleigh, NC (US); John C. Spain, Raleigh, NC (US)

(73) Assignee: TOMPKINS INTERNATIONAL, Raleigh, NC (US)

( * ) Notice: Subject to any disclaimer, the term of this patent is extended or adjusted under 35 U.S.C. 154(b) by 89 days.

This patent is subject to a terminal disclaimer.

(21) Appl. No.: 16/232,669

(22) Filed: Dec. 26, 2018

(65) Prior Publication Data

US 2019/0126323 A1    May 2, 2019

Related U.S. Application Data

(63) Continuation of application No. PCT/US2018/046460, filed on Aug. 13, 2018.
(Continued)

(51) Int. Cl.
*B07C 3/00* (2006.01)
*B65G 1/06* (2006.01)
(Continued)

(52) U.S. Cl.
CPC ............ *B07C 5/36* (2013.01); *B07C 3/008* (2013.01); *B07C 3/18* (2013.01); *B07C 5/344* (2013.01);
(Continued)

(58) Field of Classification Search
CPC ...................................................... B07C 5/36
See application file for complete search history.

(56) References Cited

U.S. PATENT DOCUMENTS

| | | |
|---|---|---|
| 4,861,018 A | 8/1989 | Kerstein |
| 5,875,434 A | 2/1999 | Matsuoka et al. |

(Continued)

FOREIGN PATENT DOCUMENTS

| | | |
|---|---|---|
| AU | 2017207323 A1 | 8/2018 |
| CA | 2898374 A1 | 1/2016 |

(Continued)

OTHER PUBLICATIONS

ISA/CN, International Search Report for Patent Application No. PCT/CN2016/090684, dated Oct. 31, 2016.

(Continued)

*Primary Examiner* — Thomas Randazzo
(74) *Attorney, Agent, or Firm* — NK Patent Law

(57) ABSTRACT

A platform assembly for use with sorting articles includes a first panel including a plurality of markers thereon, the markers forming a track on the first panel for transit thereabout by a plurality of vehicles. Each marker includes one or more magnetic characteristics for determining an orientation of the marker. A container is positioned about at least one of the plurality of markers. The platform assembly defines a first orientation in which the platform assembly is in a retracted position and a second orientation in which the platform assembly is in an extended position with a horizontal disposition. During operation, the vehicle is directed (Continued)

by a control system to deposit an article carried thereon into a container associated with a marker based on the location and the orientation of the marker.

25 Claims, 9 Drawing Sheets

Related U.S. Application Data

(60) Provisional application No. 62/545,814, filed on Aug. 15, 2017.

(51) Int. Cl.
| | |
|---|---|
| *B07C 5/36* | (2006.01) |
| *G06K 19/07* | (2006.01) |
| *B07C 3/18* | (2006.01) |
| *G05B 19/418* | (2006.01) |
| *G06K 7/10* | (2006.01) |
| *G06K 19/06* | (2006.01) |
| *B07C 7/02* | (2006.01) |
| *B07C 5/344* | (2006.01) |
| *G06K 7/14* | (2006.01) |

(52) U.S. Cl.
CPC .............. *B07C 7/02* (2013.01); *B65G 1/065* (2013.01); *G05B 19/41895* (2013.01); *G06K 7/10* (2013.01); *G06K 7/10366* (2013.01); *G06K 7/1417* (2013.01); *G06K 19/06028* (2013.01); *G06K 19/06196* (2013.01); *G06K 19/0723* (2013.01); *B07C 2301/0016* (2013.01)

(56) References Cited

U.S. PATENT DOCUMENTS

| | | | |
|---|---|---|---|
| 6,775,588 B1 | 8/2004 | Peck | |
| 6,895,301 B2 | 5/2005 | Mountz | |
| 7,119,689 B2 | 10/2006 | Mallett et al. | |
| 7,221,276 B2 | 5/2007 | Olsen, III et al. | |
| 7,402,018 B2 | 7/2008 | Mountz et al. | |
| 7,826,919 B2 | 11/2010 | DAndrea et al. | |
| 7,912,574 B2 | 3/2011 | Wurman et al. | |
| 7,991,505 B2 | 8/2011 | Lert, Jr. et al. | |
| 8,280,547 B2 | 10/2012 | DAndrea et al. | |
| 8,442,266 B2 | 5/2013 | Berger et al. | |
| 8,515,575 B2 | 8/2013 | Pfeiffer | |
| 8,639,382 B1 | 1/2014 | Clark et al. | |
| 8,718,814 B1 | 5/2014 | Clark et al. | |
| 8,731,708 B2 | 5/2014 | Shakes et al. | |
| 8,857,348 B2 | 10/2014 | Gevaert et al. | |
| 8,857,625 B1* | 10/2014 | Oropeza | B65G 15/30 |
| | | | 209/698 |
| 9,010,517 B2 | 4/2015 | Hayduchok et al. | |
| 9,037,286 B2 | 5/2015 | Lert | |
| 9,067,744 B2 | 6/2015 | Takizawa et al. | |
| 9,152,149 B1 | 10/2015 | Palamarchuk et al. | |
| 9,317,034 B2 | 4/2016 | Hoffman et al. | |
| 9,342,811 B2 | 5/2016 | Mountz et al. | |
| 9,346,620 B2 | 5/2016 | Brunner et al. | |
| 9,436,184 B2 | 9/2016 | DAndrea et al. | |
| 9,499,346 B2 | 11/2016 | Triesenberg, III et al. | |
| 9,519,882 B2 | 12/2016 | Galluzzo et al. | |
| 9,600,798 B2 | 3/2017 | Battles et al. | |
| 9,656,804 B2 | 5/2017 | Lyon et al. | |
| 9,802,759 B2 | 10/2017 | Lert, Jr. | |
| 9,855,586 B2 | 1/2018 | Chirol et al. | |
| 9,950,863 B2 | 4/2018 | OBrien et al. | |
| 9,975,148 B2 | 5/2018 | Zhu et al. | |
| 2004/0073333 A1 | 4/2004 | Brill | |
| 2005/0047895 A1 | 3/2005 | Lert | |
| 2007/0065258 A1 | 3/2007 | Benedict et al. | |
| 2007/0071585 A1 | 3/2007 | Henkel | |
| 2007/0179690 A1* | 8/2007 | Stewart | G01C 21/00 |
| | | | 701/23 |
| 2009/0010741 A1 | 1/2009 | Burgstaller et al. | |
| 2010/0300048 A1 | 12/2010 | Krizmanic et al. | |
| 2012/0290125 A1 | 11/2012 | Perry | |
| 2014/0067184 A1* | 3/2014 | Murphy | G05D 1/0265 |
| | | | 701/23 |
| 2014/0118117 A1* | 5/2014 | Zomchek | G01S 5/14 |
| | | | 340/10.5 |
| 2014/0172223 A1* | 6/2014 | Murphy | G05D 1/0289 |
| | | | 701/25 |
| 2014/0244026 A1 | 8/2014 | Neiser | |
| 2015/0139762 A1* | 5/2015 | Stephens | E04H 6/22 |
| | | | 414/261 |
| 2015/0332213 A1 | 11/2015 | Galluzzo et al. | |
| 2016/0067746 A1* | 3/2016 | Soukos | B07B 13/00 |
| | | | 241/81 |
| 2016/0171441 A1 | 6/2016 | Lively et al. | |
| 2016/0242457 A1* | 8/2016 | Minnicucci | B07B 1/4636 |
| 2017/0174432 A1* | 6/2017 | Zhu | B07C 3/08 |
| 2017/0183158 A1 | 6/2017 | Zhu et al. | |
| 2017/0260008 A1* | 9/2017 | DeWitt | B65G 1/1373 |
| 2018/0039282 A1 | 2/2018 | Gupta et al. | |
| 2018/0111808 A1 | 4/2018 | Hoeltgen et al. | |
| 2018/0275680 A1 | 9/2018 | Gupta et al. | |
| 2019/0004521 A1* | 1/2019 | Nguyen | B25J 5/007 |
| 2019/0064785 A1 | 2/2019 | Wurman et al. | |
| 2019/0218035 A1* | 7/2019 | Futch | B65G 1/1375 |

FOREIGN PATENT DOCUMENTS

| | | |
|---|---|---|
| CN | 103331266 A | 10/2013 |
| CN | 103354797 A | 10/2013 |
| CN | 104525488 A | 4/2015 |
| CN | 105057219 A | 11/2015 |
| CN | 204817212 U | 12/2015 |
| CN | 204817213 U | 12/2015 |
| CN | 105929740 A | 9/2016 |
| CN | 206661696 U | 11/2017 |
| CN | 107458828 A | 12/2017 |
| EP | 1590272 B1 | 8/2010 |
| JP | 2000288476 A | 10/2000 |
| SU | 1323380 A1 | 7/1987 |
| WO | WO0110574 A1 | 2/2001 |
| WO | WO0132322 A1 | 5/2001 |
| WO | WO2012123513 A1 | 9/2012 |
| WO | WO2016125000 A1 | 8/2016 |
| WO | WO2017074028 A1 | 5/2017 |
| WO | WO2017123678 A1 | 7/2017 |
| WO | 2019036346 A1 | 2/2019 |

OTHER PUBLICATIONS

ISA/KR, International Search Report and Written Opinion for Patent Application No. PCT/US2018/019135, dated Jun. 26, 2018.
USPTO, Non-Final Office Action in U.S. Appl. No. 15/455,099 dated May 30, 2017.
USPTO, Final Office Action in U.S. Appl. No. 15/455,099 dated Oct. 11, 2017.
USPTO, Non-Final Office Action in U.S. Appl. No. 15/455,094 dated Jun. 1, 2017.
USPTO, Final Office Action in U.S. Appl. No. 15/455,094 dated Feb. 13, 2018.
USPTO, Non-Final Office Action in U.S. Appl. No. 15/984,757 dated Oct. 15, 2018.
USPTO, Non-Final Office Action in U.S. Appl. No. 16/353,250 dated Apr. 11, 2019.
ISA/KR, International Search Report and Written Opinion for Patent Application No. PCT/US2018/046460, dated Nov. 28, 2018.
PCT, International Search Report and Written Opinion in International Application No. PCT/US2020/024624 dated Jul. 2, 2020.
USPTO, non-Final Office Action in U.S. Appl. No. 16/232,669 dated Jun. 9, 2020.
WIPO; International Preliminary Report on Patentability for International Patent Application No. PCT/US2018/046460 dated Feb. 27, 2020, 7 pages.

(56) References Cited

OTHER PUBLICATIONS

USPTO; Non-Final Office Action for U.S. Appl. No. 16/363,105 dated Sep. 14, 2020, 8 pages.

* cited by examiner

MOBILE SORTER PLATFORMS AND METHOD FOR SORTING ARTICLES

CROSS-REFERENCE TO RELATED APPLICATIONS

This application is a continuation of PCT Patent Application No. PCT/US2018/046460 filed on Aug. 13, 2018, which claims priority to U.S. Provisional Patent Application No. 62/545,814 filed on Aug. 15, 2017, the entire contents of which are incorporated by reference herein.

TECHNICAL FIELD

The present invention relates to mobile sorter platforms for sorting articles, the mobile sorter platforms including markers for navigation of computer-controlled transport vehicles, and containers for receiving the sorted articles from the computer-controlled transport vehicles.

BACKGROUND

There is an increasing need for traditional brick-and-mortar retailers to perform competitively in ecommerce & BOPIS (Buy Online Pickup In Store) fulfillment. Most ecommerce fulfillment is performed in dedicated fulfillment centers. However, these fulfillment centers require dedicated inventory and are often further from the customers than the physical stores or local omni-channel fulfillment centers. By using the inventory that is already located in brick-and-mortar stores or local mini distribution centers, and by taking advantage of the proximity of these operating sites to customers, a retailer can fulfill ecommerce orders at a lower cost and with a shorter delivery time than from a dedicated fulfillment center. BOPIS can also be filled more effectively and provide a competitive advantage by leveraging the ability to efficiently fulfill small, individual customer orders.

In order to fulfill ecommerce orders from within a store, typically employees pick items from store shelves and from back-room storage locations. Typically, this process is to have employees pick individual orders discretely, or to pick a few orders discretely in a batch. This requires the employee to potentially travel the entire store to pick one or a small number of orders. The other way to process this is to batch pick a large number of orders and then manually sort the items out to individual orders. All of these options are very labor-intensive, slow, and prone to error given that most of these employees are typically transitional or low skilled. Additionally, once an ecommerce order is complete and packed for parcel shipment, the outbound parcel orders also need to be sorted according to the customer destination. In a dedicated fulfillment center, both item sorting and parcel sorting would be performed by automated sorting equipment. Such equipment is too large, too expensive, and too inflexible to be used in the back room of a retail store. In addition, these large systems are fixed assets that occupy a large space and cannot be moved into and out of areas and service.

Therefore, a need exists for mobile platforms to enable improved sorting systems to be implemented in the back rooms of retail stores and in similar other applications.

DISCLOSURE OF THE INVENTION

An exemplary embodiment of the present invention provides for a platform assembly for use with sorting articles. The platform assembly comprises a first panel comprising a plurality of markers thereon, the markers forming a track on the first panel for transit thereabout by a plurality of vehicles. Each marker further comprises one or more magnetic characteristics for determining an orientation of the marker, and a container positioned about at least one of the plurality of markers. The platform assembly defines a first orientation in which the platform assembly is in a retracted position and a second orientation in which the platform assembly is in an extended position with a horizontal disposition, wherein, in operation, the vehicle is directed by a control system to deposit an article carried thereon into a container associated with a marker based on the location and the orientation of the marker.

A further embodiment of the present invention provides a system for use with sorting articles. The system comprises a platform assembly comprising a first panel comprising a plurality of markers thereon, the markers forming a track on the first panel for transit thereabout by a plurality of vehicles. Each marker comprises one or more magnetic characteristics for determining an orientation of the marker. The platform assembly defines a first orientation in which the platform assembly is in a retracted position and a second orientation in which the platform assembly is in an extended position with a horizontal disposition, and a container positioned about at least one of the plurality of markers. The control system is configured to determine a location and the orientation of a marker. The control system is further configured to determine an identity of an article carried by the vehicle based on an identifier on the article, and communicate over a network with the vehicle to direct the vehicle to deposit the article carried thereon into a container associated with the marker and the article.

A still further embodiment provides a method for sorting articles. The method comprises determining, by a controller, a location and an orientation of a marker formed on a first panel of a platform assembly. The first panel comprises a plurality of markers thereon, the markers forming a track on the first panel for transit thereabout by a plurality of vehicles. Each marker comprises one or more magnetic characteristics for determining the orientation of the marker. The platform assembly defines a first orientation in which the platform assembly is in a retracted position and a second orientation in which the platform assembly is in an extended position with a horizontal disposition. The controller determines an identity of an article carried by the vehicle based on an identifier on the article, and communicates over a network with the vehicle to direct the vehicle to deposit the article carried thereon into a container associated with the marker and the article, the container positioned about at least one of the plurality of markers.

DETAILED DESCRIPTION OF THE EMBODIMENTS

Figure 1:
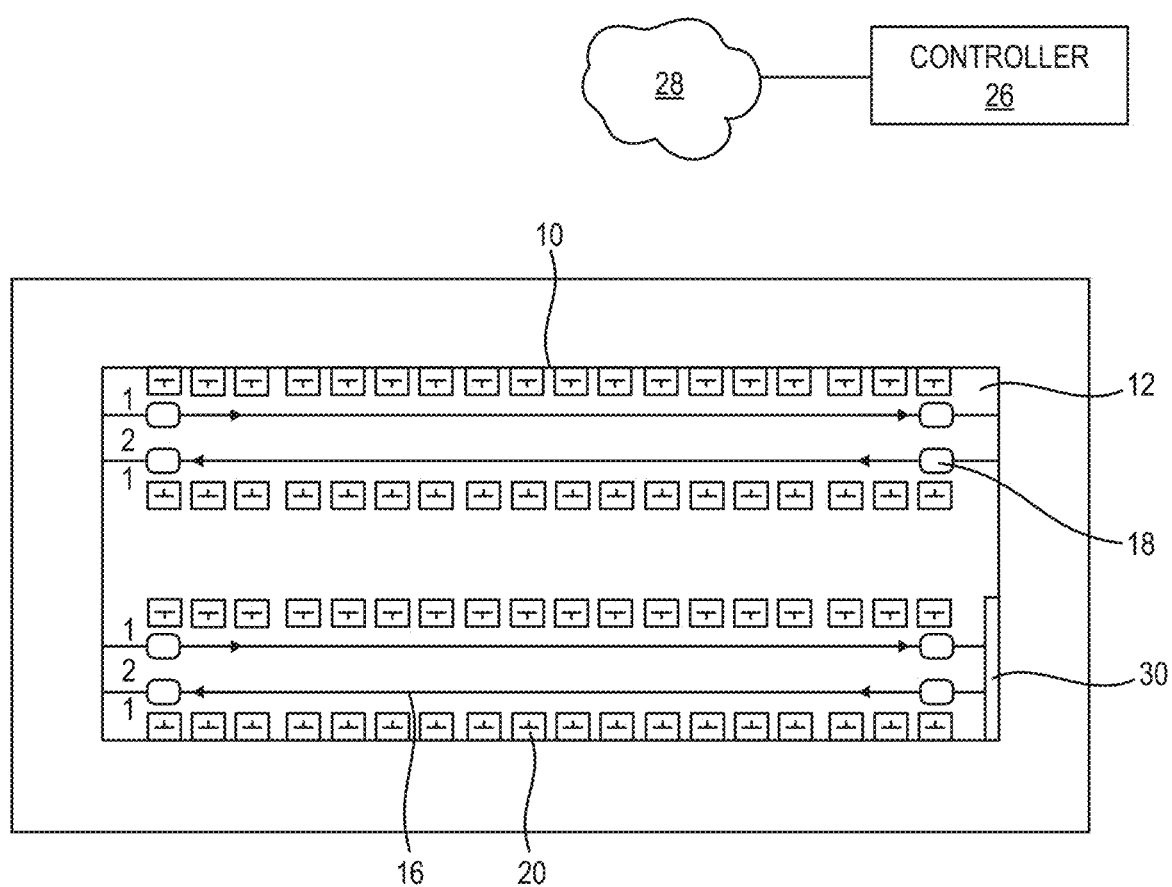
FIG. 1 is a schematic structural diagram of a platform assembly according to the present invention.

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention. The present invention will be further described with reference to the accompanying drawings:

Referring to FIG. 1, a mobile platform assembly according to the present invention for use for sorting articles is generally designated numeral 10. The mobile platform assembly 10 includes at least one panel, i.e., first panel 12, having at least one surface on which computer-controlled transport vehicles 18 may traverse. The mobile platform assembly includes caster wheels on the base and in contact with floor, allowing mobility. The mobile platform assembly is capable of attaching to one another to create a larger system compiled of a series of the table-like structures. The mobile platform assembly may be capable of collapsing to reduce the footprint and allow easier movement and storage during periods not in use. When a mobile platform assembly is foldable, the surface of each panel is attached to the center support by a hinged support which allows the surface to be rotated to a positioned vertically position for storage, or horizontally for sorting operations. In some embodiments, the at least one foldable table has two or more surfaces which computer-controlled transport vehicles may traverse. The two or more surfaces are all attached to the center support by a hinge which allows the table to be stored with all surfaces in a vertical position. The two or more surfaces may also be positioned horizontally for sorting operations.

In some embodiments, a series more than one foldable of tables are adjoined at the short side such that they form a long platforms with at least one surface which the transport vehicles may traverse. In some embodiments, the platform assembly 10 may be non-folding. In the case where non-folding, the tables are mobile due to there being a) wheels on the tables for mobility; and 2) the tables can be linked together to create a system and unlinked in order to move in a mobile manner to another location to reconnected to create the same system or another, different version of a sorter system. In one embodiment, the invention may include a series of platform assemblies that are capable of being unlinked, moved to another location either within a facility or into another facility, and linked back together to create the same or a different configuration for sortation in a manner that leverages simple methods for fast disassembly, movement, reassembly and reintegration of the platforms. In one embodiment, the platform assembly may be capable of linking to other platform assemblies to create any configuration for the arrangement of platform 10 with panels 12 and markers 14. In a further embodiment, a system of platform assemblies may have additional platforms added to the system in a modular and scalable manner to change the functional capacity, design, or capability of the sortation system. Further, in one embodiment, the platform assembly may not be retractable but may otherwise retain some or all other characteristics of the platform assemblies as described herein.

In addition, the platform assembly system can be moved to another location inside a distribution facility, relocate a sorter system to a new facility, expand the system with bolt-on additional elements and make the entire system portable, flexible, and modular in a fast and effective fashion. The platform assembly system could be stored in the store back room in a collapsed state, be portable and set up rapidly, then the automated sorting could be performed in a retail location. The platform assembly could advantageously be set up in a portion of the back room which is often used only for a portion of the day, such as the receiving area, and so could be used in existing store buildings without the need for expansion. The portable assembly system could find applications in Pop Up distribution centers, local mini distribution centers, and any other types of short term duration facilities. The platform assembly system could use existing computer-controlled transport vehicles by providing one or more surfaces for the robots to traverse. This solution would provide faster delivery to customers, lower capital cost of ecommerce fulfillment, better utilization of inventory, reduced delivery costs to customers, and greater worker productivity. The system can fulfill local market ecommerce orders, BOPIS orders, and also be used to sort inbound, less than case quantity per item, store replenishment items to a fine breakdown by aisle or aisle segment to facilitate easier, faster, more productive store shelf replenishment.

The platform assembly 10 may also include a track 16 formed on its surface so that the vehicles 18 may traverse along the track 16. The track 16 may be formed around, across or in any other configuration on the surface of first panel 12 to facilitate movement of the vehicles 18. The platform assembly 10 further includes a plurality of markers 14 formed on it (markers 14 are not shown in FIG. 1 due to the scale of the drawing; markers 14 are illustrated, for e.g., in FIGS. 7, 8a and 8b), with a container 20 positioned about at least one of the plurality of markers 14. A controller 26 forming part of a control system communicates with vehicles 18 and with a plurality of other components described herein including an induction station positioned on the platform assembly 10, the induction station including an imaging device or scanner 30. In the control system as described herein, through the provision of markers 14, when a vehicle 18 traverses over a specific marker 14, the controller 26 communicates over a network 28 with the vehicle 18 to determine that a specific vehicle 18 is at location "A" associated with a specific container 20, for example (the controller 26 is already aware of the specific location of each of the markers 14 formed on the platform assembly 10). The location of the specific vehicle 18 is then compared with a known association of an order of any type that is being processed (or any type of shipping package processed in the system) with the specific container 20.

Figure 9:
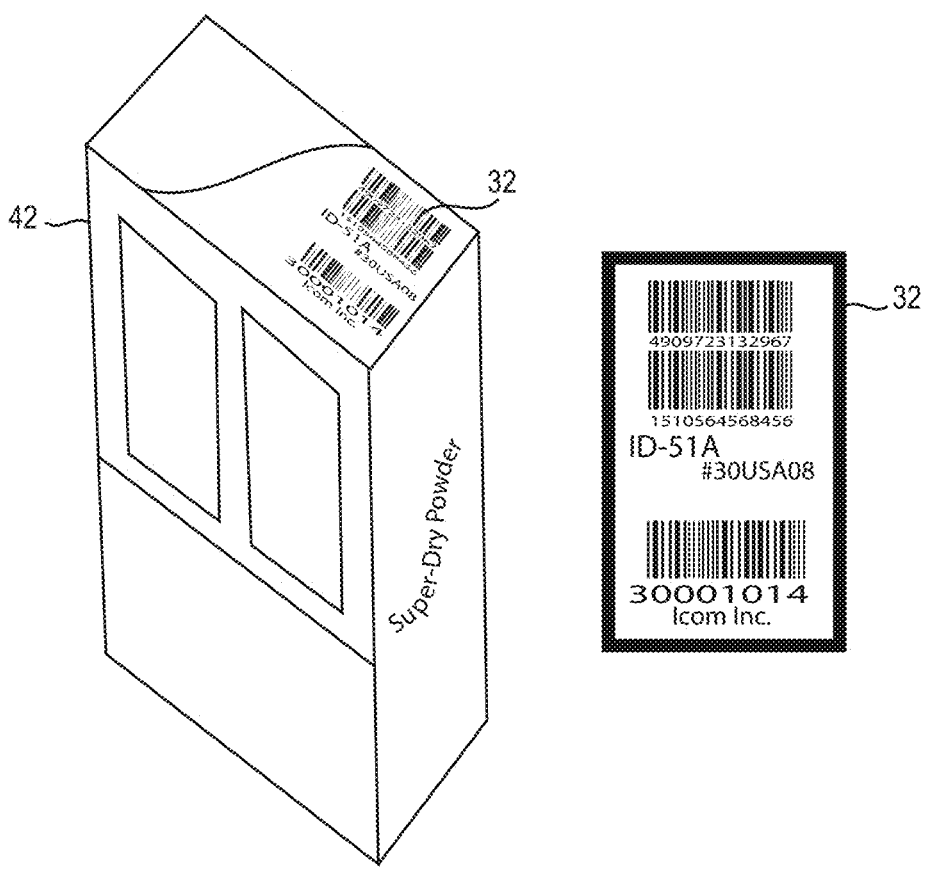
FIG. 9 is a schematic structural diagram of an article with an identifier marked on it according to the present invention.
Figure 10:
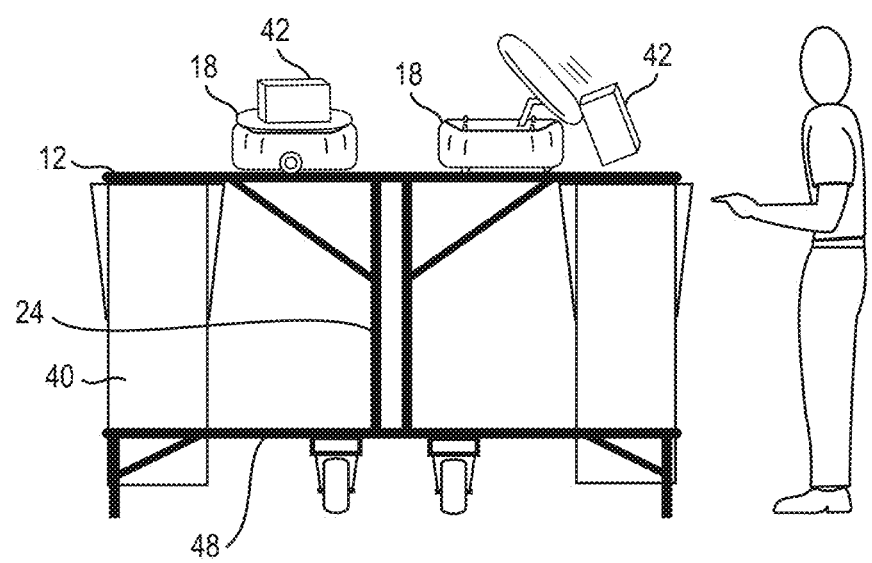
FIG. 10 is a schematic structural diagram of an embodiment of the platform assembly in an extended position with a vehicle delivering an article into a bag according to the present invention.

The vehicle 18 carrying thereon an article 42 associated with the retail order (an exemplary embodiment of an article 42 is illustrated in FIG. 9) may then be directed by the controller 26 to deposit the article 42 into the specific container 20 associated with the specific marker 14 based on the location of the specific marker. Thus, in operation, once the control system determines that a destination container 20 needs an article 42 deposited therein, the controller 26 of the control system causes vehicle 18 to traverse the first panel 12 to the destination container 20 and to deposit the article 42 by manipulation of the vehicle 18 from a first position where the article 42 is firmly located on the vehicle 18 to a second position where the article commences sliding towards the destination container 20 for depositing the selected article 42 in the container 20. As an illustrative example, FIG. 10 shows an example of the vehicles 18 traversing the platform assembly 10 with one of the vehicles 18 shown in the process of depositing an article 42 into a bag 40.

The vehicle 18 may include a sorting robot, a transportation robot, a loading/unloading robot or other types of traveling robots. The vehicle 18, in addition to being in wireless connection with controller 26, may also be in wireless connection with a server. Based on instructions/signals received from the controller 26 of the control system, the vehicle 18 is capable of traveling forward or backward as well as turning along track 16 to a target area associated with a container 20 as marked by a marker 14 to perform tasks such as unloading (or loading) articles.

The controller 26 communicates over the network 28, which may be a wired or wireless network. The wireless network may be Bluetooth®, WIFI, a specific Radio Frequency, cellular, and the like. The control system comprising the controller 26 may be embodied as a server with a processor and a memory, where the processor executes many instructions provided herein. The controller 26 may be configured to receive an order for a plurality of disparate articles to fulfill an order. The disparate articles may be a plurality of similar articles having different sizes, colors, and the like, such as apparel, or the disparate articles may be largely unrelated. The controller 26 may be configured to determine one destination container 20 among a plurality of destination containers 20 to deposit, with the vehicle 18, a selected article 42. The controller 26 may be configured to direct the vehicle 18 to transport the selected article which is stowed about the vehicle to the destination container 20 and deposit/unload the article by manipulation of the transport vehicle for deposit of the selected article in the destination container 20. The controller 26 may further be configured to determine when a given retail order is complete.

Figure 4:
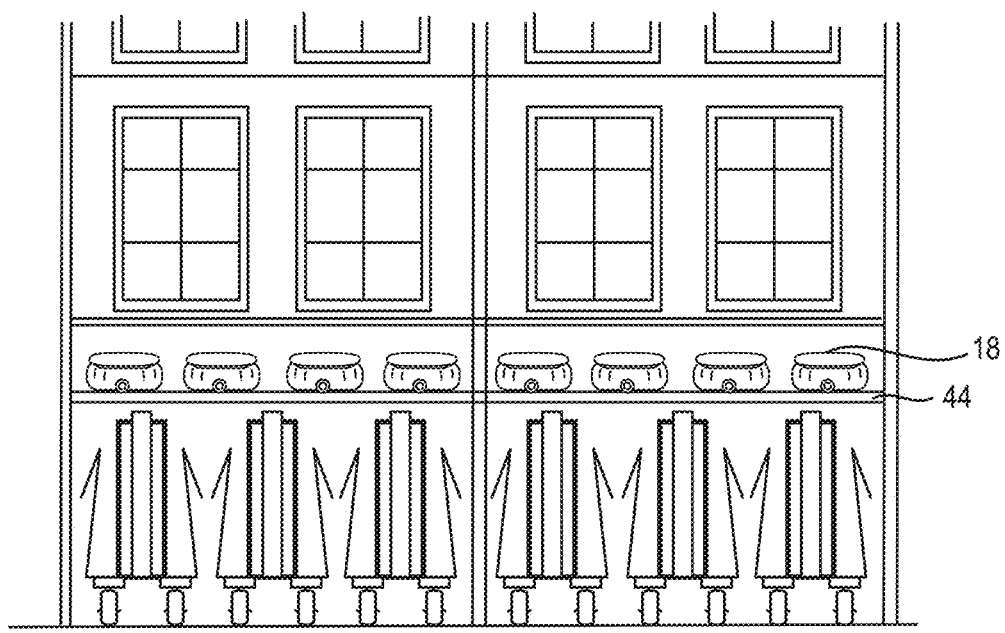
FIG. 4 is a schematic structural diagram of an embodiment of the platform assembly in a retracted position with vehicles stored overhead according to the present invention.

Referring now to FIG. 4, when platform assembly 10 is to be stored, platform assembly 10 is folded in a first orientation in which the platform assembly 10 is in a retracted position. FIG. 4 illustrates several platform assemblies 10 stowed in the retracted position. This ensures that the platform assembly 10 occupies minimal space in its retracted position. Further, prior to the platform assembly 10 being folded to its retracted position, the vehicles 18 may be stored overhead in a vehicle storage location 44 as illustrated in FIG. 4.

Figure 5:
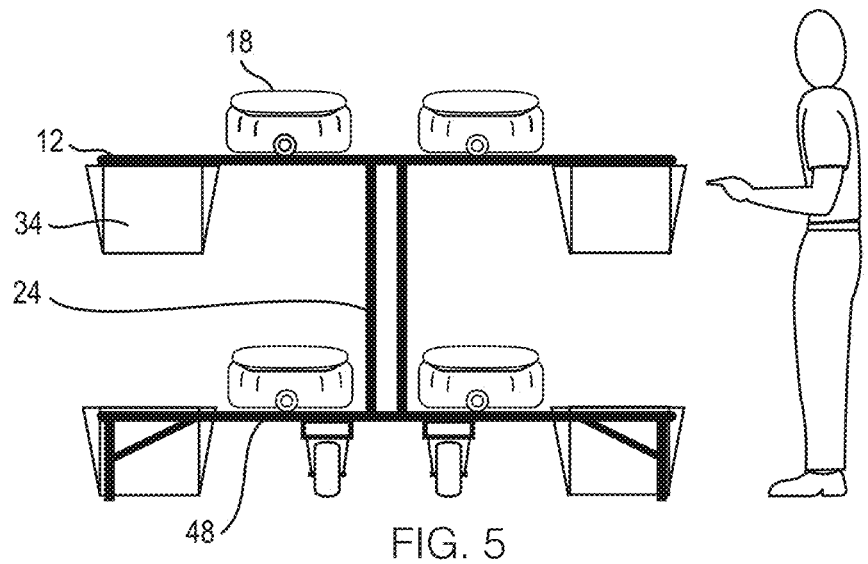
FIG. 5 is a schematic structural diagram of an embodiment of the platform assembly in an extended position with totes provided according to the present invention.
Figure 6:
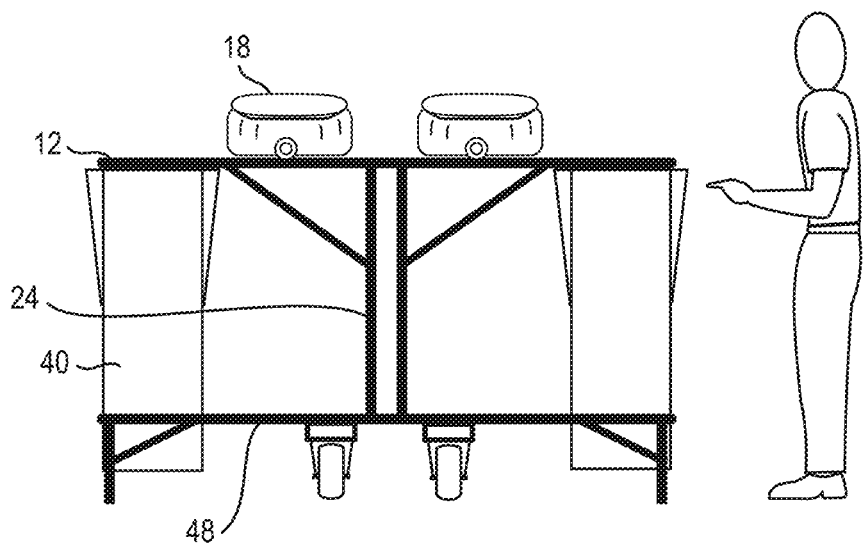
FIG. 6 is a schematic structural diagram of an embodiment of the platform assembly in an extended position with bags provided according to the present invention.

Referring now to FIGS. 5 and 6, the platform assembly 10 further defines a second orientation in which it is in an extended position with a horizontal orientation. In FIG. 5, the containers 20 of FIG. 1 are replaced with totes 34, while in FIG. 6, the containers are replaced with bags 40 having a larger holding capacity as compared to the totes 34 shown in FIG. 5. Further, as shown in FIGS. 5 and 6, the platform assembly 10 includes two panels, i.e., a second panel 48 in addition to the first panel 12, the first panel 12 and second panel 48 being connected by a center support 24 with the first panel 12 elevated higher than the second panel 48. The platform assembly 10 may thus be embodied in a multiple level arrangement, which includes an elevated platform (e.g., first panel 12) above a lower level, which may be the floor or a second platform (e.g., second panel 48). The second panel 48 may be identical to the first panel 12 in structure, layout, function, utility etc.

Referring now to FIG. 10, there is shown another multiple level arrangement wherein vehicle 18 is directed by controller 26 to deposit an article 42 carried thereon into a bag 40 associated with a marker 14 based on the location of the marker 14.

Figure 7:
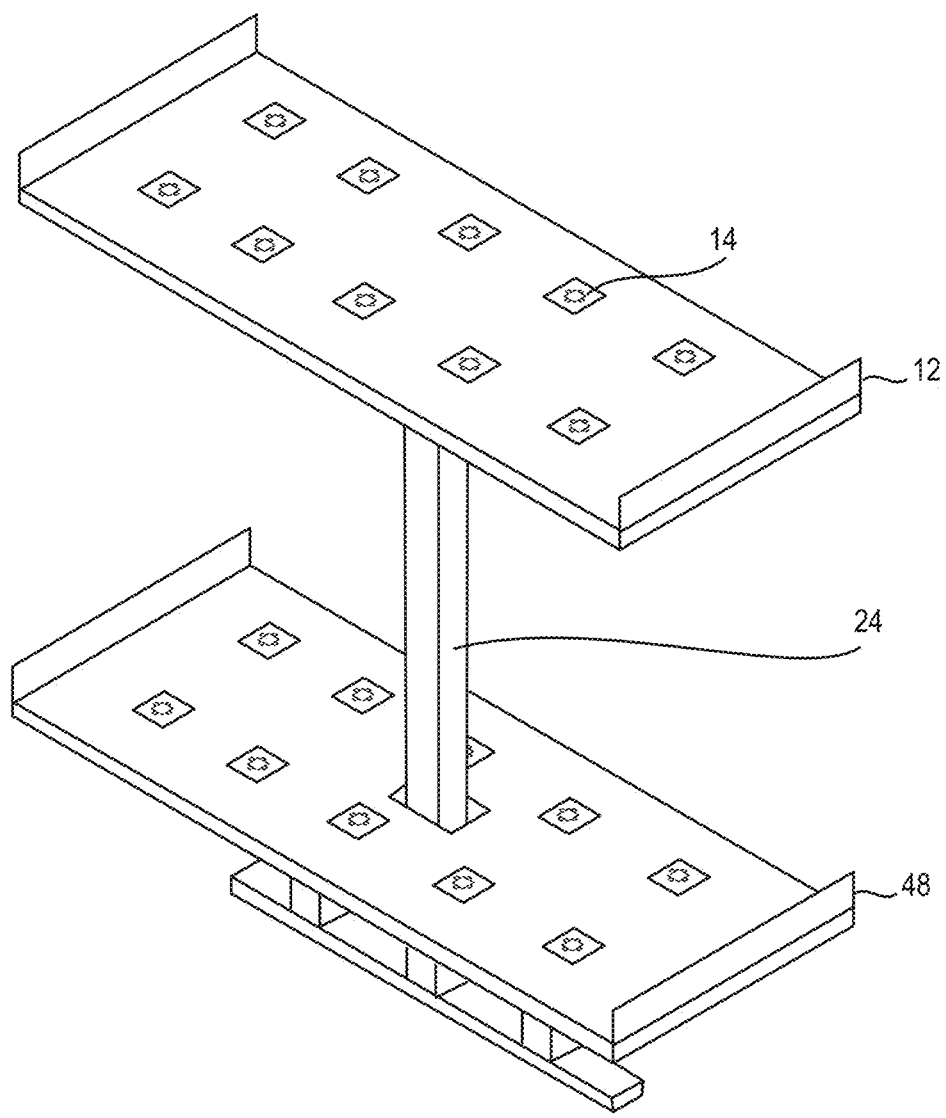
FIG. 7 is a schematic structural diagram of an embodiment of the platform assembly with two panels according to the present invention.

Referring now to FIG. 7, the platform assembly 10 shows the first panel 12 and the second panel 48 connected by the center support 24 with the first panel 12 being elevated compared to the second panel 48. FIG. 7 also show markers 14 marked on both the first panel 12 and the second panel 48 (the tracks 16 are not shown in FIG. 7). In some embodiments, the platform assembly 10 may include more than two panels, with the panels positioned above and below one another.

Figure 2:
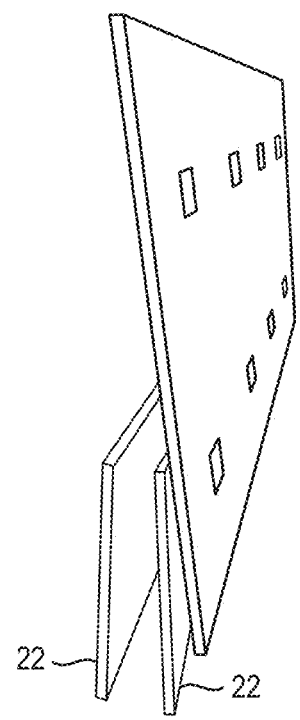
FIG. 2 is a schematic structural diagram of an embodiment of the platform assembly with two partial sections in a retracted position according to the present invention.
Figure 3:
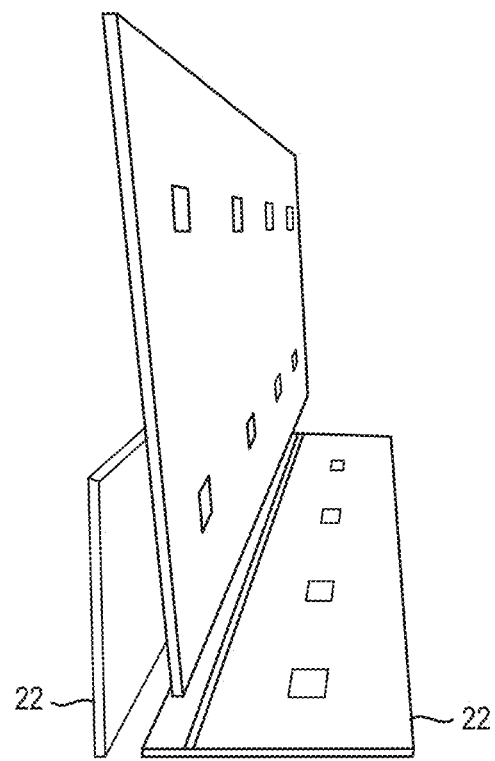
FIG. 3 is a schematic structural diagram of the platform assembly of FIG. 2 with one partial section is in an extended position according to the present invention.

Referring now to FIGS. 2 and 3, FIG. 2 shows the platform assembly 10 in a retracted position (i.e., in the first orientation); in particular, in FIG. 2, two partial sections 22 of the platform assembly 10 are shown to be in the retracted position (i.e., in the first orientation). On the other hand, FIG. 3 shows one of the two partial sections 22 in an extended position (i.e., in the second orientation); in FIG. 3, the other of the two partial sections 22 may be transferred to an extended position whereby the two partial sections 22 provide a level surface for vehicles 18 to traverse therein. The partial sections 22 may be attached to one or more center supports 24 (center support 24 is labeled, for e.g., in FIG. 6) by a hinge which allows the surface of the partial sections 22 to be positioned vertically for storage, or horizontally for sorting operations. In alternate embodiments the partial sections may slide horizontally over each other (or be folded one over the other in a horizontal orientation) for storage whereby the partial sections may be positioned horizontally in a retracted position during storage. Further, as shown in FIGS. 2 and 3, each first panel 12 or second panel 48 may include just one section (see the tallest among the three sections); alternately, each first panel 12 or second panel 48 may include two or more partial sections 22. While FIG. 2 shows the both partial sections 22 located on one side of the tallest section for storage purposes, in other embodiments the partial sections 22 may be located one on each side of the tallest section.

Further, in some embodiments, the platform assembly 10 may include two or more foldable table like sections that are adjoined at the short side such that they form a long platform with one continuous level surface on which transport vehicles 18 may traverse.

Figure 11A:
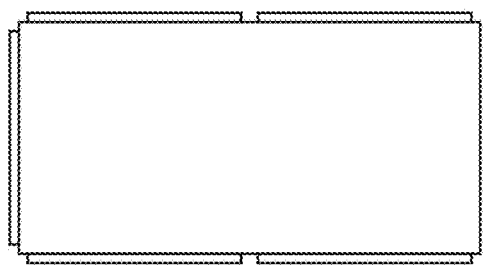
FIGS. 11A-11D are schematic structural diagrams of further embodiments of the platform assembly according to the present invention.
Figure 11B:
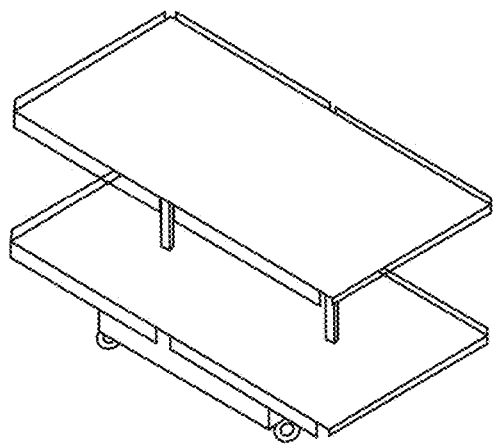
Figure 11C:
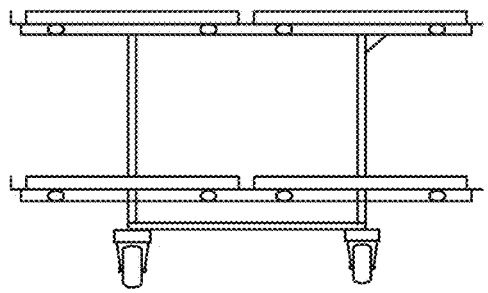
Figure 11D:
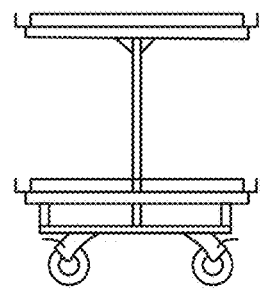

Referring now to FIGS. 11A-11D, FIG. 11A shows a top view of a further embodiment of the panel assembly 10 while FIG. 11B shows a side perspective view of the panel assembly 10 of FIG. 11A. As shown in FIG. 11B, the first panel 12 and the second panel 48 may be connected to each other by two center supports 24. FIG. 11C shows a side view of a furthermore embodiment of the panel assembly 10 while FIG. 11C shows a front view of the panel assembly 10 of FIG. 11C. As shown in FIG. 11A, each of the first panel 12 and the second panel 48 may be consist of two or more partial sections 22. As shown in the embodiments illustrated in FIGS. 11A-11D, the platform assembly 10 may include wheels or similar other mechanism to provide mobility to the panel assembly 10, for example, from a storage location to a sorting location; each of the embodiments further includes provisions for detachably securing the containers 20 to the panel assembly 10.

As noted earlier, and as shown, for e.g., in FIG. 10, the vehicle 18 is directed by controller 26 of the control system to deposit an article 42 carried thereon into a bag 40 associated with a marker 14 based on a location of the marker 14. In this manner, there may be provided a container such as a box (or alternatively a bag or a tote or any other receptacle) intended for a certain recipient associated with a particular order, for example. Once all articles associated with that recipient have been deposited by one or more vehicles 18 controlled by the controller 26 in a specific container or receptacle associated for the certain recipient associated with the particular order, the controller 26 may inform a user to come and remove the container or receptacle proximal the platform assembly 10. In case of this receptacle being a shipping container, the operator would seal the container shut with tape, and then replace the shipping container with a new, empty shipping container associated with another order.

Figure 8A:
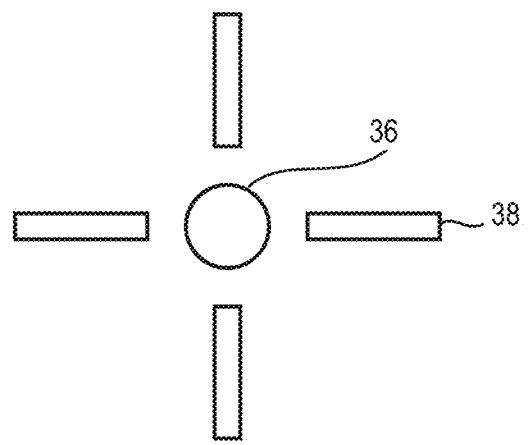
FIGS. 8a and 8b are schematic structural diagrams of markers according to various embodiments of the present invention.
Figure 8B:
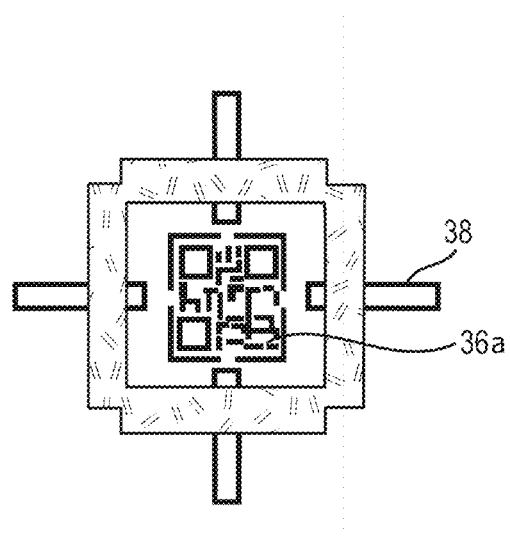

Referring now to FIGS. 8a and 8b, FIG. 8a provides one configuration of the marker 14 formed on platform assembly 10. In various embodiments, the markers 14 may include RFID tags, QR codes, magnetic arrays, other navigation or location identification methods, and the like. FIG. 8a illustrates one example of marker 14 that includes a RFID tag 36 that is bordered by one or more magnets that are inducted, taped, or applied by other means to the surface of first panel 12. The system may include any number of other types of navigation or location identification methods to include QR codes and any other method. As illustrated in this specific example of a system of RFID and magnets, in one embodiment as shown in FIG. 8a, marker 14 may include a magnetic array comprising magnetic bars 38 that extend from a periphery of the RFID tag 36 and create a combined magnetic field. In an alternate embodiment as shown in FIG. 8b, marker 14 may include a magnetic array comprising magnetic bars 38 that extend from a periphery of QR code 36a. In a further embodiment not illustrated herein, one magnetic bar may be "missing" in order to alter the magnetic field. In another embodiment not illustrated herein, one magnetic bar may be "double stacked" on another magnetic bar on one side. In a furthermore embodiment not illustrated herein, in addition to, or in lieu of, the above arrangements, one magnetic bar may be of the opposite magnetic polarity as the others. The magnetic bars may further follow other patterns in order to produce various magnetic signatures. By reading the RFID tag 36 and by further measuring the magnetic force with an interrogator and imaging device (the magnetic force corresponding to the magnetic field that produces the magnetic signature), the control system can determine location (by the RFID tag) and orientation (by the magnetic force). RFID or a similar other measurement system may interact with the RFID tag for determining location.

Referring to FIG. 9, at the induction station, an imaging device or scanner 30 interacts with an identifier 32 present on an article 42. As shown in FIG. 9, the identifier may be a UPC code; alternately, the identifier may be a similar other unique identification code. The imaging device or scanner 30 is positioned proximal the platform assembly 10. In one embodiment, the imaging device or scanner 30 is a UPC scanner; in an alternate embodiment, the imaging device or scanner 30 may be carried by, and operated by, a person, i.e., the imaging device or scanner 30 may not be fixedly positioned. In a further embodiment, each vehicle 18 may include a scannable code such that when an article 42 is placed on the vehicle 18, the imaging device or scanner 30 scans both the UPC on the article 42 and the scannable code on the vehicle 18 to determine which article is associated with which vehicle. Alternatively, the vehicle 18 may include an imaging device or scanner mounted thereon for imaging the code or identifier 32 present on the article 42. All of these identification devices may be RFID tags, other types of bar codes, or any other type of item and vehicle recognition methods.

Now additional exemplary aspects of how the method of sorting articles by the sorting system is explained. In operation, a retail store or e-commerce marketplace receives a plurality of orders. The plurality of orders may then be separated and aggregated by a location. For example, the plurality of orders may be aggregated to delivery locations within 50 miles of Charlotte, N.C. Accordingly, each order that is to be delivered to an address within 50 miles of Charlotte, N.C. is sent to a retailer or warehouse in Charlotte, N.C. The orders may be cross-checked against inventory on hand at the retailer or warehouse; the orders may also be checked for other relevant characteristics before a batch of such orders are picked by an employee so that the batched set of orders can be filled and shipped. Similarly, a batch of BOPIS orders may be sent to a local facility where customers have placed those orders for pick up at a future time, typically within a few hours and on the same day.

A batch of such orders is then picked by an employee. In a retail setting, the articles associated with the batched set of orders may be picked from the retail shelves or from articles stored within the warehousing portion of a retail location. As an example, below is provided a simplified batched set of orders:

Order 1: 3 red shirts, 2 green shoes, 5 white shirts
Order 2: 1 red shirt, 5 green shoes, 2 white shirts
Order 3: 2 red shirts, 4 green shoes, 4 white shirts
Order 4: 2 boxes of cereal, 3 items of canned vegetables, a pickle jar, and a tube of refrigerated cookie dough
Order 5: 3 red shirts, 1 box of cereal, 3 packs of prepackaged food, and a notebook The batched set of orders stated above includes represents 43 items across 5 orders that may be BOPIS or for local ecommerce delivery. An employee gathers all 43 items in the batched set, without sorting the 43 items by individual orders. In most cases, such a system would be set up to process a few to hundreds of orders in a batch manner as described.

To sort the articles by each individual order, the platform assembly 10 is moved from its storage location to a suitable location; then, in the case of a foldable embodiment, the disposition of the platform assembly 10 is changed from a retracted position to an extended position. The vehicles 18, which are in wireless connection with controller 26, and optionally in wireless connection with a server, are then placed on platform assembly 10 such that each of the vehicles 18 is able to identify its position relative to the markers 14 on the platform assembly 10 and is accordingly capable of traversing the platform assembly 10. Multiple platform assemblies 10 can be joined in a configuration to allow a system to be as large as needed to process the quantity of orders and volume of order items in the batch.

The batched items (i.e., the 43 items) are then positioned on or in proximity to the platform assembly 10 where the controller 26 controlling the imaging device or scanner 30 located at the induction station determines that a first article is a white shirt, and coordinates the placement of the first article on vehicle 18-1, and directs the vehicle 18-1 to deposit the first article in container no. 3 (among several containers 20), which the controller knows is associated with marker no. A3 (among several markers 14; the markers 14 may include RFID tags and/or other identification methods). The vehicle 18-1 moves proximal to marker no. A3, then deposits the article into container no. 3. The routine is repeated for each of the remaining 26 items. When each of the individual orders 1, 2 and 3 are filled within each associated container 20, each of the containers is removed, packaging label applied if not already present, and prepared for delivery to the recipient.

Thus, a batch of orders can be packed for shipment through the use of the automated system as explained herein. Once all of the orders in the batch are packaged, the orders may then be sorted by zip code or by other local delivery hub belonging to a courier service, the US Post Office, or other delivery agent. The automated system can also be used for large grouping of orders for delivery wherein one large group of orders may be consolidated into a single large container such as a traditional shipping polybag, letter pack, large envelop, or a large box across a wide range of sizes.

In one implementation, a given retail or ecommerce shipping location may service dozens of such delivery hubs in a given local area, with a plurality of order parcels to be sorted and shipped to each of those delivery hubs. In such a case, at the given retail or ecommerce shipping location, the plurality of order parcels to be sorted and shipped may be positioned on or in proximity to the platform assembly 10 as described herein where, the imaging/scanner device 30 determines that the first package has a barcode that designates the order information that the controller 26 recognizes as being destined for a particular delivery hub. The controller 26 coordinates placement of the first package on vehicle 18-1, and coordinates the deposition of the first package in a container associated with delivery hub location no. 3, which the controller recognizes as being associated with marker no. A3. The vehicle 18-1 being controlled by controller 26 moves proximal to marker no. A3, then deposits the package into the container associated with delivery hub location no. 3. This routine is repeated for each remaining parcel packages. After all packages to a delivery hub are placed in the associated container, the container may be removed, and prepared for delivery. Alternately, if the container gets filled prior to placement of all packages associated with the delivery hub, the container may be removed and replaced with a new container to be filled with the remaining packages destined for the same delivery hub as the filled-up container.

The platform assemblies and systems as described herein may form a system for the processing of the following elements in the below applications:
  Items to fulfill ecommerce orders
  Items to fulfill BOPIS orders
  Shipping packages for delivery to end customers
  Items to fulfill retail store replenishment orders
  Cartons containing store replenishment items
  Items for returns, kitting, or any other process where individual items or packages are sorted into groups, orders, or other required quantities
  In a retail store
  In a local mini distribution center
  In a pop up fulfillment center
  In a regional or national distribution center or ecommerce fulfillment center As to the above, they are merely specific embodiments of the present invention; however, the scope of protection of the present invention is not limited thereto, and within the disclosed technical scope of the present invention, any modifications or substitutions that a person skilled in the art could readily conceive of should fall within the scope of protection of the present invention. Thus, the scope of protection of the present invention shall be determined by the scope of protection of the appended claims.

What is claimed is:

1. A platform assembly for use with sorting articles, the platform assembly comprising:
   a first panel comprising a plurality of markers thereon, the markers forming a track on the first panel for transit thereabout by a plurality of vehicles, each marker comprising one or more magnetic characteristics for determining an orientation of the marker, and
   a container positioned about at least one of the plurality of markers,
   wherein the platform assembly defines a first orientation in which the platform assembly is in a retracted position and a second orientation in which the platform assembly is in an extended position with a horizontal disposition,
   wherein, in operation, the vehicle is directed by a control system to deposit an article carried thereon into a container associated with a marker based on the location and the orientation of the marker.

2. The platform assembly of claim 1, wherein the first panel defines two partial sections that are pivotably engaged when the platform assembly is in the extended position.

3. The platform assembly of claim 1, wherein the container is one of a bag or a box.

4. The platform assembly of claim 1, wherein an imaging device, RFID reader or a scanner interacts with an identifier on the article.

5. The platform assembly of claim 1, comprising a second panel, wherein the first panel is elevated compared to the second panel.

6. The platform assembly of claim 1, wherein the vehicle comprises an imaging device, RFID reader or a scanner.

7. The platform assembly of claim 1, wherein the container is associated with a delivery hub, delivery route, a zip code or other geographic identifier, wherein the delivery hub, delivery route, zip code or other geographic identifier is associated with a plurality of parcels.

8. The platform assembly of claim 1, wherein the container is associated with a retail or online order.

9. The platform assembly of claim 1, wherein the track includes a grid.

10. The platform assembly of claim 1, wherein at least one marker comprises an RFID tag and a magnetic array, the magnetic array comprising one or more magnetic bars, wherein the magnetic bars extend from a periphery of an RFID tag to form a magnetic field that produces a magnetic signature.

11. The platform assembly of claim 10, wherein at least one magnetic bar is of an opposite magnetic polarity as the other magnetic bars, or at least one side of the periphery of the RFID tag lacks a magnetic bar.

12. The platform assembly of claim 10, wherein the RFID tag is configured to provide a location of the marker, and a magnetic force is configured to provide an orientation of the marker, wherein the magnetic force corresponds to the magnetic field that produces the magnetic signature.

13. A system for use with sorting articles, the system comprising:
a platform assembly comprising a first panel comprising a plurality of markers thereon, the markers forming a track on the first panel for transit thereabout by a plurality of vehicles, each marker comprising one or more magnetic characteristics for determining an orientation of the marker, wherein the platform assembly defines a first orientation in which the platform assembly is in a retracted position and a second orientation in which the platform assembly is in an extended position with a horizontal disposition, and a container positioned about at least one of the plurality of markers, and
a control system configured to:
determine a location and an orientation of a marker;
determine an identity of an article carried by the vehicle based on an identifier on the article; and
communicate over a network with the vehicle to direct the vehicle to deposit the article carried thereon into a container associated with the marker and the article.

14. The system of claim 13, wherein the control system is configured to:
sort articles from a batched order comprising a plurality of orders, and
communicate over a network with the vehicle to direct the vehicle to deposit articles associated with a single order into the container associated with the marker.

15. The system of claim 13, wherein the control system is configured to inform a user to remove the container associated with the marker after deposit of all articles associated with an order.

16. The system of claim 13, wherein the first panel defines two partial sections that are pivotably engaged when the platform assembly is in the extended position.

17. A method for sorting articles, the method comprising:
determining, by a controller, a location and an orientation of a marker formed on a first panel of a platform assembly, the first panel comprising a plurality of markers thereon, the markers forming a track on the first panel for transit thereabout by a plurality of vehicles, each marker comprising one or more magnetic characteristics for determining the orientation of the marker, wherein the platform assembly defines a first orientation in which the platform assembly is in a retracted position and a second orientation in which the platform assembly is in an extended position with a horizontal disposition,
determining, by the controller, an identity of an article carried by the vehicle based on an identifier on the article;
communicating over a network, by the controller, with the vehicle to direct the vehicle to deposit the article carried thereon into a container associated with the marker and the article, the container positioned about at least one of the plurality of markers.

18. The method of claim 17, further comprising:
sorting articles, by the controller, from a batched order comprising a plurality of orders, and
communicating over a network, by the controller, with the vehicle to direct the vehicle to deposit articles associated with a single order into the container associated with the marker.

19. The method of claim 17, further comprising:
informing a user, by the controller, to remove the container associated with the marker after deposit of the article.

20. The method of claim 17, wherein the first panel defines two partial sections that are pivotably engaged when the platform assembly is in the extended position.

21. The method of claim 17, wherein the container is one of a bag or a box.

22. The method of claim 17, wherein an imaging device, RFID reader or a scanner interacts with an identifier on the article.

23. The method of claim 17, wherein the panel comprises a second panel, wherein the first panel is elevated compared to the second panel.

24. The method of claim 17, wherein the vehicle comprises an imaging device, RFID reader or a scanner.

25. The method of claim 17, wherein at least one marker comprises an RFID tag and a magnetic array, the magnetic array comprising one or more magnetic bars, wherein the magnetic bars extend from a periphery of an RFID tag to form a magnetic field that produces a magnetic signature.

* * * * *